Inventor
SHERMAN C. HETH

Sept. 21, 1954
S. C. HETH
2,689,442
REEL ADJUSTING DEVICE
Filed April 14, 1951
4 Sheets-Sheet 2
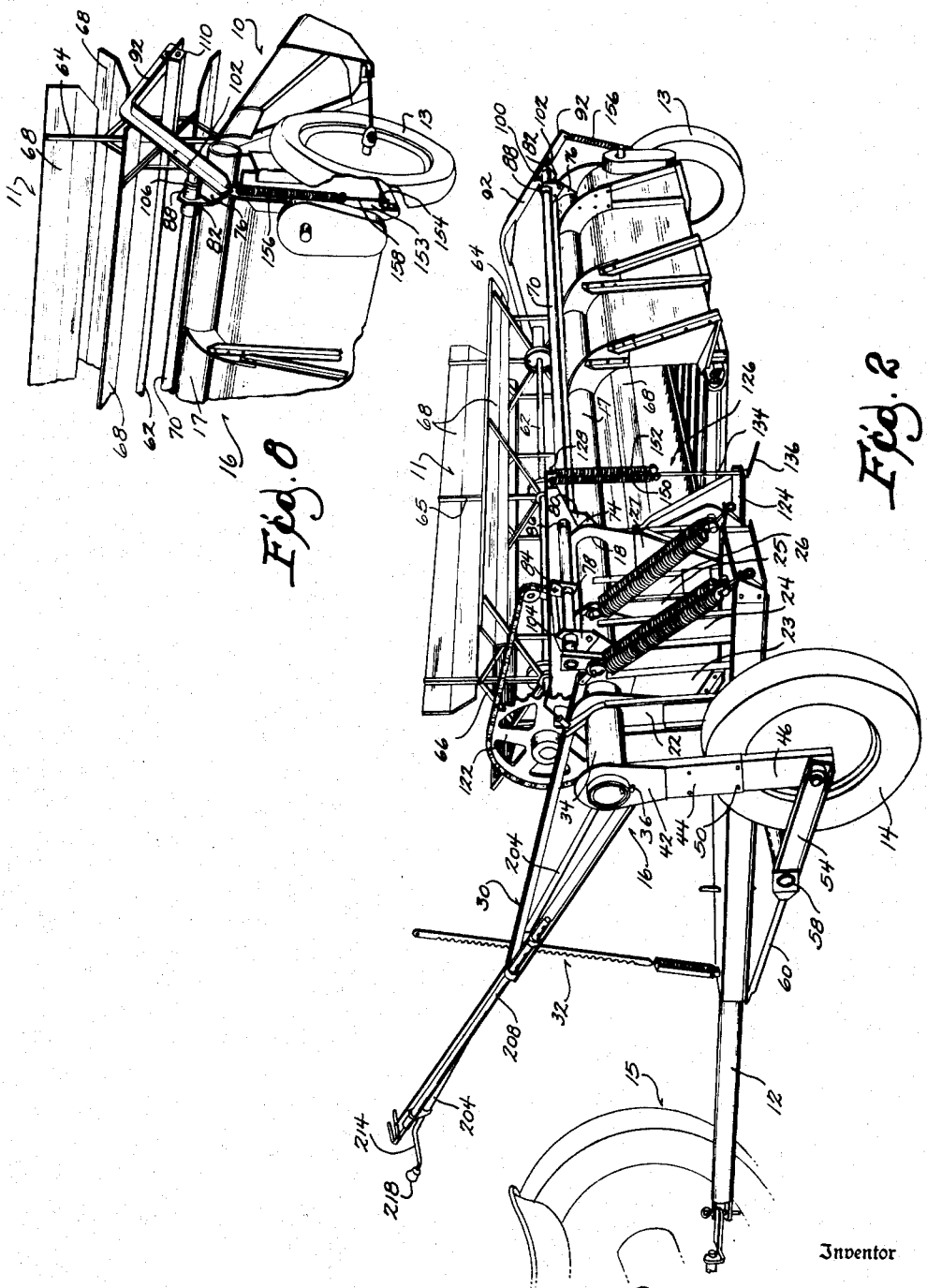
Inventor
SHERMAN C. HETH
By
Agent

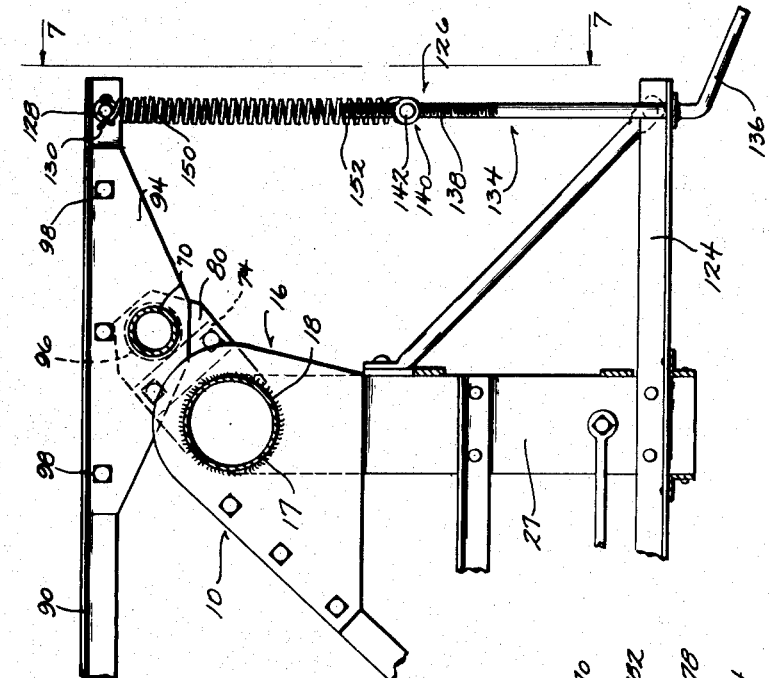
Fig. 6
Fig. 3
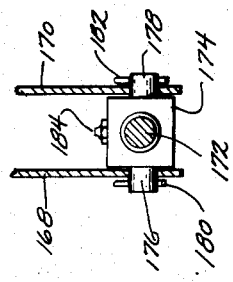
Fig. 4
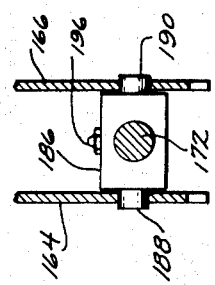
Fig. 5
Inventor
SHERMAN C. HETH
Agent

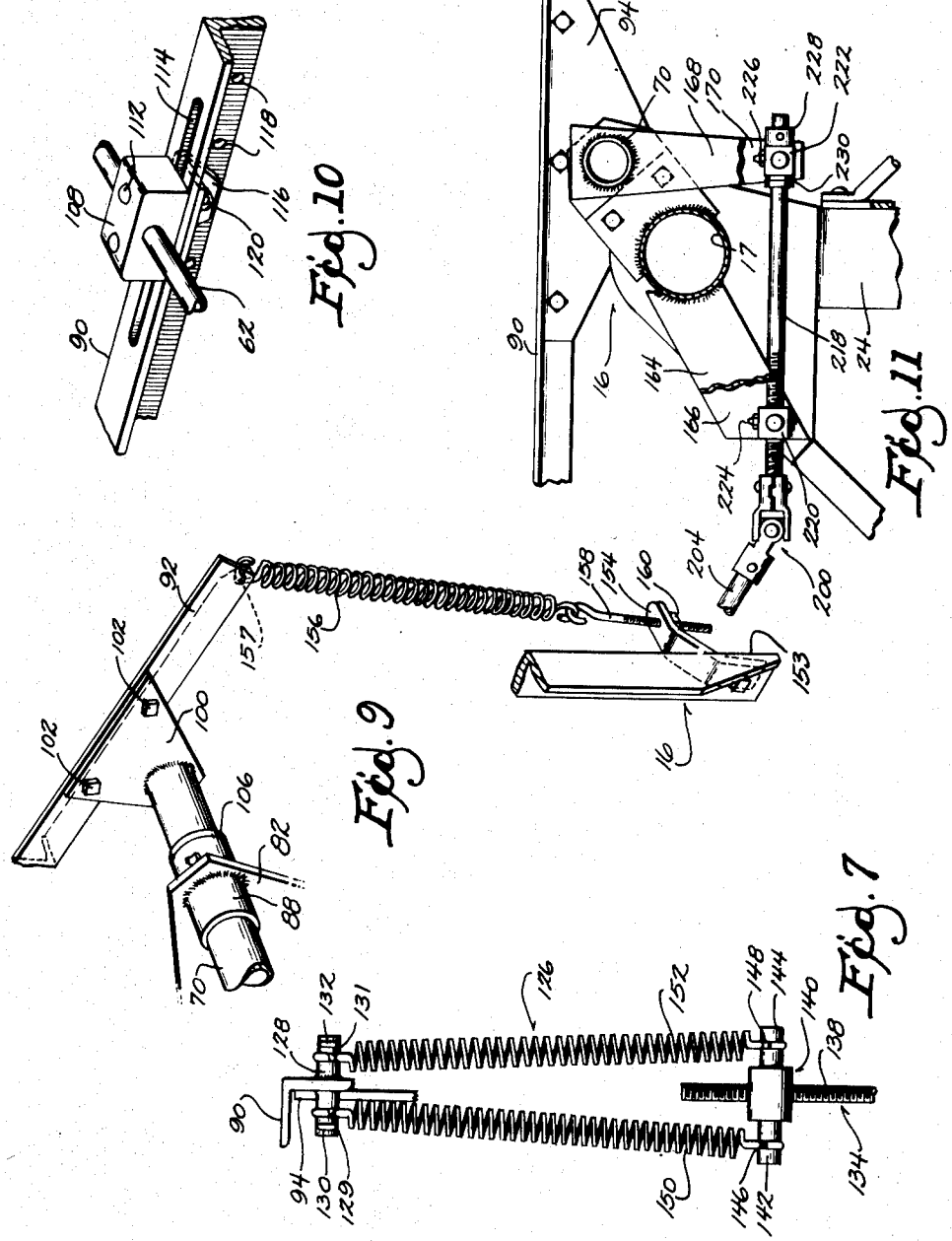

Patented Sept. 21, 1954

2,689,442

UNITED STATES PATENT OFFICE 2,689,442

REEL ADJUSTING DEVICE

Sherman C. Heth, Racine, Wis., assignor to J. I. Case Company, Racine, Wis., a corporation of Wisconsin Application April 14, 1951, Serial No. 221,036

4 Claims. (Cl. 56—221)

This invention relates to harvesting machines and especially to the reel height-adjusting means on windrowers and other implements employing reels. In this instance the invention is shown in conjunction with a windrower.

The purpose of the reel on a windrower, or similar implement is to urge the standing grain rearwardly against the sickle and onto the platform from which it is conveyed to the ground as when windrowing, or to a threshing cylinder as when combining or threshing.

Owing to variations in the height of grain being harvested and for various other reasons it is often desirable to adjust the height of the reel with respect to the platform and also with respect to the ground. This adjustment is made frequently and therefore the means of adjustment should be conveniently reached by the operator. In the case of a tractor-drawn windrower the adjusting means should be within easy reach of the tractor seat, and be operable with a minimum of effort on the part of the tractor operator.

It is an object of this invention to provide a reel-height adjustment that is convenient to the tractor operator and easily adjusted.

Another object is to provide a reel-height adjustment which retains the adjustment although the implement travels over rough ground at which time the reel is subjected to considerable vibration.

Another object of this invention is to provide a reel-height adjustment which allows adjustments to be made in smaller increments than those made by means of a post having spaced notches for the reception of a detent or pin.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings, Fig. 1 shows a front perspective view at the left side of a windrower embracing the invention.

Fig. 2 is a rear perspective view at the left side of the windrower;

Fig. 3 is a sectional view of a fragmentary portion at the left end of the windrower showing a specific portion of the invention;

Fig. 4 is an enlarged sectional view taken at 4—4 of Fig. 3;

Fig. 5 is an enlarged sectional fragmentary view at 5—5 of Fig. 3;

Fig. 6 is a sectional fragmentary view of the left pivot means for the reel;

Fig. 7 is a rear elevation of a portion of the machine taken at 7—7 of Fig. 6;

Fig. 8 is a fragmentary perspective view showing the right hand end of the windrower;

Fig. 9 is a fragmentary view of the construction at the right hand end of the reel support means;

Fig. 10 is a detail of certain mechanism indicated in Fig. 8 and shows the means of mounting the reel bearing block and Fig. 11 is a fragmentary elevation which shows a modification of the construction shown in Fig. 3.

Figure 1:
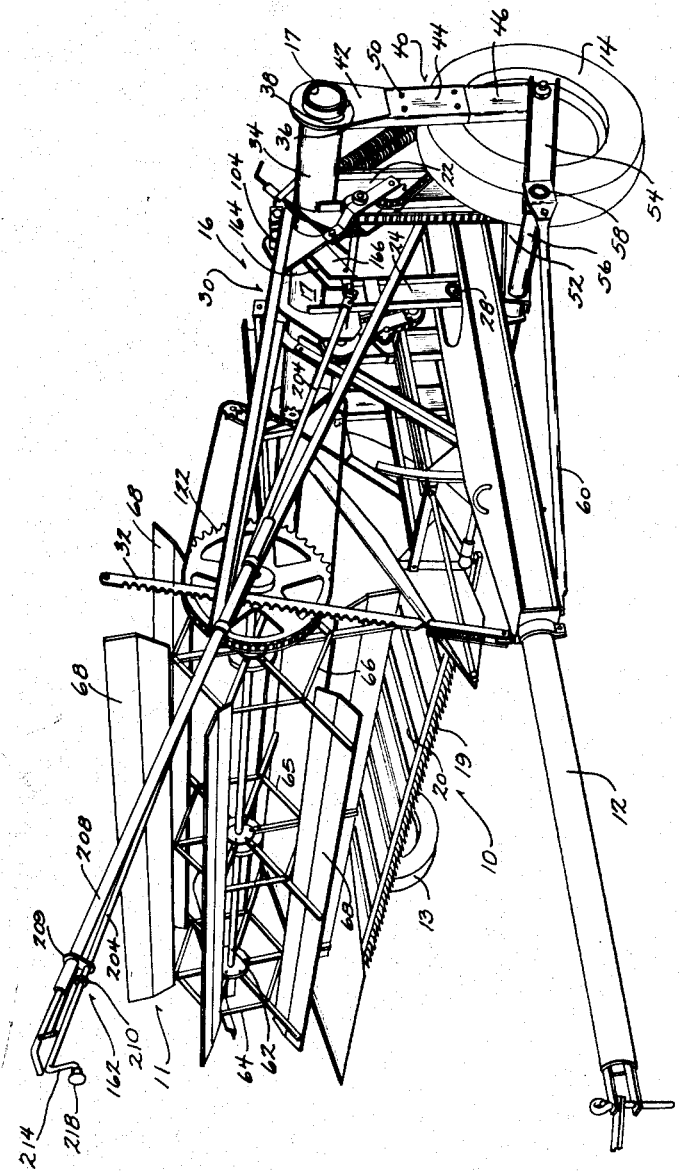

The general view shown in Fig. 1 shows a windrower 10, provided with a reel 11, a drawbar 12 and transport wheels 13 and 14. Drawbar 12 is attached to a tractor 15, Fig. 2, so that the windrower 10 can be transported over the ground.

Windrower 10 is described in greater detail in the patent to Kranick et al. 2,395,672 on which this invention is an improvement.

The frame 16 comprises a transverse tubular member 17 to which the various braces and depending members are secured, as by welding 18, shown in Figs. 2 and 6, and also by riveting or bolting; whichever mode is most suitable. Frame 16 carries a sickle bar 19 and an apron 20 which form part of the conventional windrower, and need not be further described.

Frame 16 has depending therefrom members 22 to 27 inclusive which serve to support the tubular member 17 relative to the draw bar 12. Pivots are provided, one of which is shown as at 28, to enable the sickle 19 to be adjusted to the desired height relative to the ground, and the drawbar 12. An adjusting lever 30 is secured integrally with frame 16, and a rack bar 32 is pivoted to the drawbar 12 and is engaged by a detent secured to the adjusting lever 30. Thus sickle bar 19 can be secured at the desired relative height.

In order to obtain a greater range of adjustment for height, wheels 13 and 14 are mounted upon vertically adjustable supports. Referring to Fig. 1, 34 is a sleeve which provides a bearing for the tubular member 17, the latter being retained in axial relation to the sleeve 34 by a bolt 36 in a slot 38 of sleeve 34. Depending from sleeve 34 is a support 40 comprising a plate 42 secured to sleeve 34 preferably by welding, and a channel member 44 secured to plate 42 by welding. A second channel member 46 fits within channel 44. Channel members 44 and 46 are provided with mutually selectively registrable holes. Bolts such as at 50 secure channel members 44 and 46 in the desired relationship. A similar means of height adjustment is provided for wheel 13 and which is not shown in detail. A pair of channel members 52 and 54 are pivoted at a point forward of the axis of wheel 14 and on each side of the latter. A tubular member 56 separates members 52 and 54 being secured thereto by welding in this instance. Another tubular member 58 is secured to the underside of drawbar 12 as shown in Fig. 1, being of a snug fit within tubular member 56 and provides a pivot for the latter. A brace 60 is secured to the member 58 and the drawbar 12 to aid in resisting twisting forces which tend to swing the right wheel 13 rearwardly when the implement is being transported over the field. As support 40 is integral with sleeve member 34 the tubular member 17 is journaled in the latter and will not be affected by an adjustment of the frame 16 by lever 30.

The reel 11 is of the conventional type having a shaft 62 carrying spiders 64, 65, and 66. In this instance the reel 11 carries six bats 68 which are secured to the spiders as shown in Figs. 1, 2, and 8.

The reel height-adjusting and support means will next be described. A tubular shaft 70, Figs. 2 and 3, comprises the means of support for the reel 11. A series of support plates 72, 74, and 76 are secured to the positions shown on tubular member 17 by welding or other suitable means of fastening. Plates 72, 74, and 76 provide the support for bearing plates 78, 80, and 82. Bearing sleeves 84, 86, and 88 support tubular shaft 70 and are welded in this instance to plates 78 and 80 and 82 respectively.

Reel 11 is supported by arms 90 and 92, Figs. 3, 6, and 8, which are positioned one at each end of the reel. Arm 90 supports the left-hand end of the reel and is of angle iron as shown in Figs. 2 and 8. Arm 90 is of a length sufficient to extend forwardly beyond the shaft 70. A plate 94 having a hole to accommodate the shaft 70 is placed upon shaft 70 and welded as at 96 or otherwise secured thereto in the position shown in Fig. 6. Plate 94 is of a horizontal length so as to provide sufficient support for the arm 90. Arm 90 and plate 94 have a plurality of aligned holes into which bolts 98 are inserted thus making arm 90 an integral unit with shaft 70, and rotatable therewith.

Shaft 70 is of a length such that the ends thereof protrude beyond the bearing sleeves 84 and 88 for reasons which will appear as the description proceeds.

Arm 92 is mounted on shaft 70 in a manner similar to that employed with respect to arm 90. A plate 100, Fig. 9, provided with a hole into which shaft 70 is inserted is welded or similarly secured to the shaft 70. Arm 92 is provided with holes which coincide with holes provided in plate 100. Bolts 102 serve to secure plate 100 and arm 92 together integrally for actuation with shaft 70. Thus it will be clear that rotation of shaft 70 will result in corresponding rotation of the arms 90 and 92. Stop collars 104 and 106, see also Fig. 2, are welded to shaft 70 and in substantial contact with sleeves 84 and 88 respectively. The purpose of collars 104 and 106 is to limit the axial displacement of shaft 70 by contact with the ends of sleeves 84 and 88.

Reel 11 is mounted between arms 90 and 92 as shown in Figs. 1, 2, 8, and 10. In this instance shaft 62 is journaled in wood bearing blocks 108 and 110. Bearing block 108 is positioned upon the upper surface of arm 90 and secured thereto in fore-and-aft adjustable relation by two bolts 112. A slot 114 is provided in arm 90 as shown in Fig. 10 of a length sufficient to allow the desired fore-and-aft adjustments of the reel. After a fore-and-aft adjustment has been made it is important to secure it from displacement owing to vibration and impact with the grain being harvested. The above mentioned displacement is avoided by providing an angle member 116 which has holes located so as to receive bolts 112. Bolts 112 pass through bearing block 108, slot 114 and angle member 116. Nuts on the bolts 112 clamp the above-mentioned parts integrally. A series of holes 118 are provided in the web of arm 90 and a hole is provided in angle member 116. When making the adjustment in a fore-and-aft direction, angle member 116 is positioned so that a hole 118 and the hole in angle member 116 align. A bolt 120 serves to hold the arm 90 and angle member 116 against fore-and-aft displacement. When bolt 120 and bolts 112 have been tightened there is no likelihood of displacement. An arrangement similar to the above is employed at the other end of the reel and will therefore not be described. Shaft 62 protrudes from the left-hand end of reel 11 and terminates in a sprocket 122. The reel 11 is driven in this instance by the wheel 14 on which a sprocket is mounted, the latter being part of a chain and sprocket drive means which is fully shown and described in patent to Kranick et al. 2,395,672 and need not be further described.

Fig. 6 shows a section of a portion of frame 16 and especially the details relating to the construction of the left-hand reel arm 90 and the means of counterbalancing the reel. A frame member 124 is secured to frame 16 and extends rearwardly a sufficient distance to accommodate the balancing means 126 which will now be described.

The rearwardly-extending portion of arm 90 has a hole which receives a pin 128, Fig. 6, which extends on either side of the member 90 as shown in Fig. 7. Pin 128 is provided with annular grooves 129 and 131 near each end spaced from the member 90, as shown in Fig. 7. A hole is also provided at each end and cotter pins 130 and 132 are inserted, the purpose of which will be made clear. An adjusting member 134 is inserted in a hole in the member 124 and has a handle 136 to enable adjustments be easily made. The upper end of member 134 is threaded for a suitable distance as indicated at 138, the amount of threading being sufficient to embrace the full range of adjustment desired.

A spring anchor stud 140 is positioned below pin 128 a suitable distance and is provided with a threaded hole into which adjusting member 134 is inserted for relative threaded adjustment. Stud 140 has ends 142 and 144 of a reduced diameter as shown in Fig. 7; these ends are provided with annular spring retaining grooves 146 and 148 near the extremities of the ends 142 and 144. A pair of tension springs 150 and 152 having conventional hook ends are extended respectively between annular grooves 129 and 146, and between grooves 131 and 148.

The tension applied to springs 150 and 152 should be sufficient to cancel or balance a portion of the weight of the reel to enable the operator to more easily adjust the reel height. It is clear that the adjustment is made by turning handle 136.

A balancing means is also provided for the right-hand end of the reel to supplement that just described. Arm 92 extends rearwardly, as shown in Figs. 2, 8, and 9.

Angle member 153 of frame 16 has affixed at the lower part thereof and below the end of arm 92, a spring bracket 154 in the form of an angle iron and which is provided with a hole to accommodate the balancing spring means as shown in Figs. 8 and 9. This means comprises a spring 156 connected to arm 92 by means of a hook portion which is inserted in a hole 157 in arm 92. An eye bolt 158 is attached to the lower end of spring 156 and the shank thereof is inserted in the above-mentioned hole in bracket 154. Eye bolt 158 is provided with a threaded portion which extends beyond both sides of bracket 154 to provide means for adjusting the tension of spring 156. A nut 160 is placed on bolt 158 on the underside of bracket 154 and is employed by turning in well-known manner to increase or to lessen the tension of spring 156 and thereby obtain the proper balance for the adjustment of the reel 11.

Means generally designated as 162, Figs. 1 and 3, for adjusting the height of reel 11 comprises a pair of plates 164 and 166 spaced apart a suitable distance and welded or otherwise secured to member 17, as shown in Figs. 3 and 5. A pair of plates 168 and 170 depend from tubular shaft 70 and are secured to the latter by the provision of holes which receive the tubular shaft 70. Lever plates 168 and 170 are secured to shaft 70 by welding or other suitable means in spaced position, as shown in Fig. 4.

An adjusting screw 172 is positioned with the axis thereof substantially horizontal and which axis extends fore-and-aft between plates 164 and 166 and also between plates 168 and 170.

A swivel nut member 174 is trunnioned intermediate plates 168 and 170 on trunnions 176 and 178 and is free to rotate about the axis of the trunnions, as shown in Fig. 4. Holes are provided in trunnions 176 and 178 and cotter pins 180 and 182 are inserted so as to prevent inadvertent displacement of the nut 174. A grease fitting 184 is placed on nut 174 to provide means to lubricate screw 172 so as to run freely in the nut. Screw 172 is provided with sufficient thread so that the extreme limits of reel height adjustment may be obtained.

The forwardly extending portion of screw 172 is supported between plates 164 and 166 in a manner similar to that employed between plates 168 and 170. A swivel block 186 is trunnioned between plates 164 and 166, as shown in Figs. 3 and 5 on trunnions 188 and 190. The purpose of block 186 is to provide support for the forward end of screw 172 and it is provided with a hole serving as a bearing for screw 172. In order to resist thrust in a forward direction a washer 192 is placed in contact with block 186 and a second washer or collar 194 is welded or otherwise fixed on screw 172 and in contact with washer 192. A lubricating fitting 196 provides means to lubricate the screw where it rotates in block 186.

Screw 172 extends forwardly from the block 192 and is provided with a plurality of washers 198 to serve as thrust washers. A universal joint 200 is secured to screw 172, as shown in Fig. 3 by a rivet or bolt 202. Universal joint 200 is of the conventional sectional type ordinarily used on farm machinery and need not be further described. The purpose of universal joint 200 will be made clear as the description progresses.

A pipe or extension member 204 is secured to a member 206 constituting part of universal joint 200 by a rivet or bolt 207 and extends forwardly and adjacent to adjusting lever 30, as shown in Fig. 1. Pipe member 204 is supported at the forward end thereof by a bracket 209 which extends preferably substantially normal to a lever member 208 fixed to lever 30 and provides a bearing for the pipe 204. Pipe 204 is spaced from member 208 a sufficient distance so that a crank 214 formed thereon will not interfere with lever member 208. Bracket 209 provides the journal for pipe 204 and is secured to lever member 208 by welding or other suitable means of fastening.

A collar 210 is fitted over pipe 204 and is positioned forwardly of bracket 209. A set screw 212 is fitted into a threaded hole in collar 210, as shown in Fig. 3. A hole of slightly larger diameter than screw 212 is provided in pipe 204 and set screw 212 is allowed to reach through this hole. Thus the collar 210 is retained against displacement on pipe 204. An extensible crank handle 214 is provided which has a shank 216 slidable within pipe 204 and of a length to allow extension thereof to a point convenient to the operator. When the desired position has been obtained, the setting is secured by tightening the set screw 212. When screw 212 has been tightened turning of handle 214 will turn pipe 204 and the various members attached thereto and previously described. A knob 218 is attached to the end of handle 214 and is adapted to swivel so as to allow convenient manipulation of the handle 214 from the tractor seat.

Fig. 11 shows a modification of the arrangement shown in Fig. 3. An adjusting screw 218 corresponding to above-mentioned screw 172 is threaded at the forward end and cooperates with a nut 220 which is swivelly mounted between plates 164 and 166. The other end of screw 218 is journaled in a block 222 which is swiveled between plates 168 and 170 in a manner similar to that shown in Fig. 3. Lubricating fittings 224 and 226 serve to lubricate nut 220 and block 222, respectively.

Forwardly threaded portion of screw 218 is reduced in diameter to accommodate the hereinbefore described universal joint 200 which is suitably fixed to the screw 218.

A collar 228 is fixed to the rearward portion of screw 218 to prevent forward axial displacement in block 222. A washer 230 or collar is welded or otherwise secured to the screw 218 on the other side of block 222. Therefore axial movement of screw 218 in either direction compels a corresponding movement of the lever plates 168 and 170.

When reel adjustments are being made on an implement having this modification, the pipe 204 will be moved forwardly or backwardly with the screw 218.

It will be clear that the incorporation of this invention in a harvester of the type described enables the operator to adjust the height of the reel 11 relative to the apron 20, and to adjust the height of the apron 20 relative to the ground without disturbing the former adjustment. The above-mentioned adjustment can be made by the operator without the necessity of his leaving the tractor seat.

The above being a complete description of an illustrative embodiment of the invention, what is claimed as new and desired to be secured by Letters Patent of the United States is:

1. In a harvester having a transport frame, a header frame pivoted thereon, in combination, means to mount a reel on said header frame for unvarying movement with said header frame when the latter is adjusted comprising, a rockable shaft on said header frame having reel support arms secured thereto and a reel supported on said arms, a lever member extending forwardly and rigidly secured to said header frame, means on said transport frame to adjustably support said lever member and provide adjustment for said header relative to the ground, a depending lever secured to said rockable shaft, a bracket secured to said header frame forwardly of said depending lever, a threaded adjusting member, a bearing member on said bracket to support said adjusting member, a nut swivelly attached to said depending lever and engaging said adjusting member, means to limit said adjusting member against axial displacement relative to said bearing member and manual operating crank means universally connected to said adjusting member and extending forwardly substantially parallel to and intimately adjacent said lever member and within reach of the tractor operator, said lever member and said manual operating means connected together for unitary vertical movement in fixed relation.

2. In a harvester having a transport frame, a header frame pivoted thereon, in combination, means to support a reel for unvarying relationship between said header frame and said reel during adjusting of the header frame comprising, a rockable shaft on said header frame, a lever member extending forwardly and secured to said header frame, means on said transport frame to adjustably support said lever member and provide adjustment for said header relative to said transport frame, a lever arm secured to said rockable shaft, a bracket secured to said header frame forwardly of said lever arm, a threaded adjusting member, a bearing member on said lever arm to support said adjusting member, a nut swivelly attached to said bracket and co-acting with said adjusting member, means to limit said adjusting member against axial displacement relative to said depending lever and manual rotative operating means universally connected to said adjusting member and extending forwardly substantially parallel with and intimately related to said lever member and within reach of the tractor operator, said lever member and said manual operating means connected together in substantially fixed relation for unitary vertical movement.

3. In a harvester having a transport frame, a header frame pivoted thereon, in combination, means to support a reel on said header frame for unvarying relationship between said header frame and said reel during adjustment of the header frame comprising, a rockable shaft on said header frame, a forwardly extending lever member secured to said header frame, means on said transport frame to support said lever member and provide adjustment for said header relative to said transport frame, a lever arm secured to said rockable shaft, a bracket secured to said header frame and spaced from said lever arm, a threaded adjusting member, a bearing member on said bracket to support said adjusting member, a nut attached to said lever arm and co-acting with said adjusting member, manual operating means connected to said adjusting member and extending forwardly substantially parallel to said lever member and within reach of the tractor operator, and a bracket fixed to said lever member to support said manual operating means in intimate fixed relation for unitary vertical movement of said lever member and said operating means when said header is adjusted.

4. In a harvester having a transport frame, a header frame pivoted thereon, in combination, means to support a reel on said header frame for unvarying relationship between said header frame and said reel during adjustment of the header frame, comprising, and a rockable shaft on said header frame, a lever member extending forwardly and secured to said header frame, means on said transport frame to support said lever member and provide adjustment for said header relative to said transport frame, a lever arm secured to said rockable shaft, a bracket secured to said header frame, and spaced from said lever arm, an adjusting means to provide adjustment between said lever arm and said bracket, manual operating means connected to said adjusting member and extending forwardly substantially parallel to said lever member and within reach of the tractor operator, said lever member and said manual operating means connected together for fixed unitary vertical movement, and in a closely adjacent relationship.

References Cited in the file of this patent

UNITED STATES PATENTS

| Number | Name | Date |
|--------|------|------|
| 583,749 | Hertel | June 1, 1897 |
| 1,024,941 | Lambert | Apr. 30, 1912 |
| 2,226,563 | Keith | Dec. 31, 1940 |
| 2,354,987 | Fawkes | Aug. 1, 1944 |
| 2,395,672 | Kranick et al. | Feb. 26, 1946 |